Aug. 23, 1927. 1,640,155
A. B. LOW
PISTON RING SPRING PACKING
Filed March 30, 1925

Witness
John B. Dade

Inventor
Arthur B. Low.
by Wilkinson & Giusta
his Attorneys

Patented Aug. 23, 1927.

1,640,155

UNITED STATES PATENT OFFICE.

ARTHUR B. LOW, OF DENVER, COLORADO.

PISTON-RING SPRING PACKING.

Application filed March 30, 1925. Serial No. 19,417.

This invention relates, to improvements in piston ring spring packing.

From various aspects the invention may well be adapted for use with pistons generally, formed with annular grooves for the reception of resilient split piston rings, although the improvements have been primarily devised with reference to reciprocating pistons of internal combustion engines, especially automobile or analogous motors, and will be herein disclosed in such relation only, but with the understanding that the use of the invention itself is not necessarily to be restricted to this one particular field.

The primary objects of the invention are several-fold, amongst which may be stated the material prevention of certain objectionable features, such as loss of charge compression and leakage of the ignited charge which increase gas consumption without maximum resulting effect, oil pumping which unduly wastes valuable lubricating oil, carbonization resulting from the burning of pumped oil and which befouls the cylinders and spark plugs and causes less perfect ignition, piston ring slap, and piston slap caused by the tendency towards lateral angular displacement or wabbly-like sloppy motion of the piston during its extremely rapid rectilinear strokes. Another primary object of the invention is the more effective flotation of the piston, relatively to its cylinder wall, both for the purpose of substantially overcoming said sloppy motion of the piston and also for relieving its peripheral surface of undue wear, the said wear, being more directly imposed upon the piston rings themselves.

All of the objectionable aforesaid features are well understood to be of serious import from various viewpoints, including (1) material decrease in power resulting from insufficient or faulty compression of the gaseous charges, owing to leakage around behind the piston rings during compression, and because of further loss of power from analogous leakage of a portion of the unexpended combustible charge immediately after ignition (2) substantial loss or undue waste of gas owing to the immediately aforestated conditions (3) substantial loss or undue waste of lubricating oil owing to oil pumping and carbonization of the pumped oil (4) faulty ignition owing to the befouling results of said carbonization, and (5) undesirable vibrations and annoying noises that may be caused by wabbly motion of the piston and the aforesaid piston slap and piston ring slap.

Accordingly, a satisfactory solution for these vexatious problems has long been sought, and almost continuous efforts have been directed towards the devising of simple, effective and economically functioning means for overcoming the same.

With the present invention, it is the aim to remedy such defects by the employment of a novel type or types of an auxiliary spring packing coil or springly band ring-like element, which functions plurally as relatively stabilizing means between the piston and piston ring and as an anti-leak seal against the passage of compression and oil around behind the piston ring, through the annular piston groove housing the same.

The real gist of the invention resides in this auxiliary element of itself, as well as in combination with a piston ring and the manner of mounting or interposing said auxiliary element, within a complementary annular piston groove, between and in certain contacting association with the piston and a piston ring thereof, the said auxiliary spring packing element being of uniformly continuous or non-sinous formation and having its respective border edge extremities of relatively greater and lesser diameters, as distinguished from being of wave-like formation circumferentially, or from being so bowed in cross-section as to provide an intermediate annular protuberance or ridge of greater diameter that its border edge extremities.

The aforementioned and other aims and advantages, however, will be so clearly apparent as incidental to the following disclosure, it is believed, that it would serve no particularly useful purpose to further enlarge upon the same initially, and with these general outlining remarks, therefore, reference will now be immediately had to the accompanying drawings, illustrating certain practical embodiments of the improvements, in which drawings Figure 1 is an edge plan view of one form of the auxiliary element, being in the nature of a slightly tapering or conical split band ring, which obviously may be employed singly or plurally;

Figure 2 is a cross-sectional view of the same;

Figure 3 is a view in longitudinal vertical section, illustrating the application of the conical auxiliary element, of Figures 1 and 2, in association with a piston and its piston ring, the upper portion of the view showing the conical band rings as applied with their border edge extremities of greatest diameter disposed towards the working face of the piston, or uppermost in the view, and the lower portion of the view showing the application of one of the conical band rings in reversed position, although this arrangement as specifically shown is merely for convenience of illustration, and may obviously be varied in actual practice, as will hereinafter appear;

Figure 1:
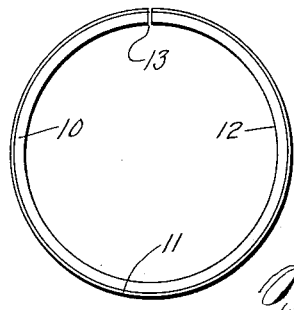
Figure 2:
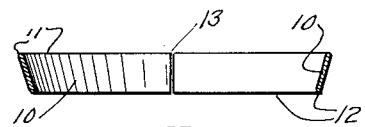
Figure 3:
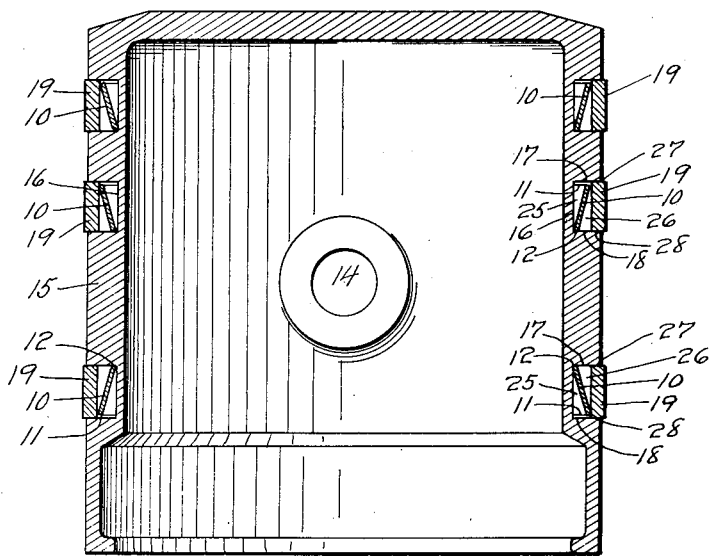
Figure 6:
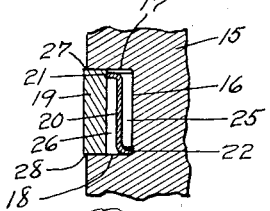
Figure 6 is a fragmentary detail sectional view, analogous to Figure 3 in a fragmentary sense, but showing the application of the modified form of split band ring illustrated at Figure 5.

In Figures 3 and 6 the piston grooves, together with the piston rings and the auxiliary band rings, are shown on a somewhat exaggerated scale, for the purpose of clearer illustration, and this is also true with the other figures, with reference to the auxiliary band rings, otherwise than as to their diameters. It is understood that piston rings are now very often made of a width even less than three-sixteenths of an inch, while the piston grooves frequently provide for only a very limited space behind the piston rings, so that my improved auxiliary band rings would naturally be made from suitable material of substantial stock, and of appropriate thickness and width relatively to the dimensions of the particular grooves and piston rings with which they are to be associated.

Figure 4:
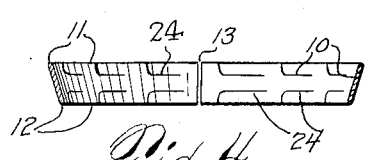
Figure 4 is a cross-sectional view, analogous to Figure 2, but of a slightly modified form of the conical band ring.

In each of Figures 1 to 4, the modified form of Figure 4 showing a slight additional feature, the numeral 10 indicates the aforesaid auxiliary element in the nature of a circular one-coil light metal springy split band ring made from such material as clock spring steel, although obviously it may be made of any other suitable material. It is flaring or formed in the shape of a slightly tapering or conical split band ring, so that what may be termed its base border edge extremity or peripheral edge face 11 is of uniformly continuous greater diameter than its other border edge extremity or peripheral edge face 12 which is also of uniformly continuous contour, and by uniformly continuous I mean that the band ring-like element is neither of wave-like formation circumferentially, nor is it formed in cross-section with an annular ridge or bowed protuberance intermediately of its border edge extremities. The slight gap 13 thereof is shown as being perpendicular or at right angles to the edge faces, although it may be slanting or of miter formation or formed as a stepped cut, analogous to the various formations of piston rings proper. The width of this springy element is relatively narrow, approximating the width of the piston ring, or slightly less than that of the piston groove, with which it is to be associated, the said element functioning in a particular manner which will be more fully explained in the description of operation, and with more especial reference to the illustration at Figure 3.

Figure 5:
Figure 5 is a view, partly in cross-section and partly in elevation, of a further modified form of the auxiliary split band ring.

Before describing such operations, however, and before describing the modified forms of Figures 4 to 6, I will first briefly refer to the illustration at Figure 3, wherein the numeral 14 indicates one of the journal bearings of a piston 15 having annular piston ring grooves for the reception of the piston rings, which latter may all be located towards one end of the piston, if desired, instead of as actually shown. The bottom or inner wall faces of said piston ring grooves are indicated at 16 and their end wall faces by the numerals 17 and 18, while the piston rings themselves are indicated at 19.

With the auxiliary element 10 disposed in the approximate operative position of Figure 3, although it will be more cramped or crowded up when the piston is in its cylinder, it will be observed that the space, between a piston ring 19 and the inner wall face or bottom 16 of its housing groove, is partitioned off by the said auxiliary element 10, in a direction longitudinally of the piston, to provide for analogously dimensioned chambers 25 and 26 annularly encompassing the outer and inner uniformly continuous faces of said auxiliary spring packing element 10, and the numerals 27 and 28 simply indicate annular spaces by way of which leakage ordinarily occurs around behind the piston rings, which is one of the objectionable features to be overcome. The foregoing, however, will hereinafter be more fully referred to.

The springy band ring 10, although of relatively stiff stock, is appropriately thin and flexible, but it is to be understood that, when circularly disposed in substantially cramped or crowded up operative position, within a complementary piston groove behind its piston ring, the said auxiliary band ring thereupon becomes more or less stiffly self-trussed, as it were, owing to its wedge-like conical form held in confined relation, while still retaining its springy characteristics but in more potentially stored up degree. It may in some instances, therefore, be desirable or even expedient to partially relieve this constrained stiffness, although my experimentations so far have not actually demonstrated any real necessity therefor.

However, at 24 in Figure 4, I have shown certain formed slits in association with the peripheral edge faces 11 and 12 of the conical split band ring, for the purpose of relieving the tension or providing for limited resiliency, and which slits are made so finely that they would hardly permit of any substantial leakage therethrough. This, however, is only by way of general illustration, as these slits may not be strictly essential, or when employed it is possible that a single series thereof would suffice, instead of the paired series as shown along the opposite edge portions 11 and 12, and they could be of equivalent or other formation, such as perpendicular, slanting, curving or other forms of slits, as might be desired.

At Figures 5 and 6, I have shown another form of the auxiliary split band ring, the wall of which in cross-section is somewhat of ogee-shape, the body portion 20 of which oppositely terminates in out-turned and in-turned annular flanges or rim portions, providing the peripheral edge face 21 of uniformly continuous greater diameter than the other peripheral edge face 22 of uniformly continuous lesser diameter, and 23 simply designates the gap between the ends of the band ring, which gap may obviously be formed by a perpendicular, a miter, or a stepped cut.

It will be observed that the peripheral edge faces 21 and 22 function substantially in the same manner as do the peripheral edge faces 11 and 12, respectively, of the other forms, excepting perhaps as to the exact positions of contact with the piston rings and walls of the piston grooves, and it may also be noted that I do not restrict myself, as to this modified form of Figures 5 and 6, to the exact shape as actually shown, because, instead of the straight central wall section 20 with the out-turned and inturned rim portions having the peripheral edge faces 21 and 22, the formation could be substituted for by making the central wall portion of diagonal disposition and terminating in oppositely disposed vertical short extensions instead of lateral rims, and doubtless other varying equivalents might be employed, provided that in all such instances one uniformly continuous peripheral edge face is of greater diameter than the other uniformly continuous peripheral edge face of lesser diameter.

For the sake of brevity and convenience in the following description of operations, as well as for succinctness in some of the claims, I will hereinafter refer to certain portions and positions as "upper" and "lower," assuming that the piston is disposed for making vertical strokes, with its compression stroke upwardly and its power stroke downwardly, but obviously such expressions are not to be construed as limitations, because if the piston was intended to operate otherwise, than as stated, the expressions "upper" and "lower" might in a certain sense be more or less inapt.

In operation, and viewing the assembly of Figure 3 which is obvious, it will be seen that, when each conical auxiliary element 10 is disposed in the position shown at the upper portion of the view, its lower border edge extremity or face 12, of the lesser diameter, seats in the lower corner formed by the bottom 16 and the lower wall surface 18 of one of the piston grooves, while its upper portion, or border edge extremity 11 of greater diameter, rests against the upper inside face of a complementary piston ring 19, with only a slight space preferably being left between the upper peripheral edge face 11, of the auxiliary element 10, and the upper wall surface 17 of the piston groove. In the reversed position of the conical element 10, as illustrated at the lower portion of Figure 3 and the reason for which alternative mountings will later appear, it will be noted that the edge face 12, of the lesser diameter, is now disposed upwardly and seats in the upper corner formed by the bottom 16 and the upper wall surface 17 of the piston groove, while its other edge portion, of greater diameter, rests against the lower inside face of its piston ring 19, with only a slight space preferably between the peripheral edge face 11, of the auxiliary element 10, and the lower wall surface 18 of the piston groove.

The mounting of the auxiliary elements 10 with their larger diameters uppermost, as shown at the upper portion of Figure 3, is primarily intended to more effectively prevent compression leakage around behind the uppermost piston rings, while the reversed mounting, as illustrated at the lower portion of the view, is primarily intended to more effectively prevent oil pumping around behind the lowermost piston ring or rings, and this regardless of the exact positioning of said piston rings. It is believed, however, that if all of the said auxiliary elements 10 were disposed with their greater diameters uppermost, they would even then prevent any material oil pumping as well as effectively preventing compression leakage, and reversely so if all of said auxiliary elements were disposed with their greatest diameters lowermost, but it may nevertheless be preferable to use the combined reversed mountings, so that I have fully set forth these possible varying uses. Furthermore, it may not be absolutely necessary, although doubtless very desirable, to mount one of these special auxiliary elements behind each piston ring of a set of several of such piston rings, as it may prove to be sufficient, in some cases at least, to provide for only one or more of such mountings, in a set of several piston rings, and preferably for the uppermost and lowermost piston rings of such set.

At all events, and regardless of any reversal of positions, it will be apparent that, when the piston is in its cylinder, the outer faces of the piston rings snugly engaging the wall of the cylinder, the appropriate inner face portions of the piston rings 19 will press inwardly against the auxiliary elements 10 circumferentially of their border extremity portions of the greatest diameter, and thus causing the cramping or crowding of the same more or less inwardly and circumferentially against the self-trussed resistance thereof, as it were, owing to the conical formation of the band ring springs. These band ring springs, therefore, are caused to store up a very potential resistance pressure that exerts its force in the opposite direction against the piston rings for spreading the latter at all times into snugly fitting relation with the cylinder wall, and, in addition to providing anti-leak sealing means against losses of compression and oil by passage around behind the piston rings, as will be explained, these auxiliary elements 10 further provide for substantial resiliently expansible stabilizing means between the piston and piston rings.

The provision of such stabilizing means, therefore, will the more effectively maintain the balancing of the piston, against wabbly motion, in proper flotative relation with its cylinder, not only as a preventative against undue wear on the piston proper, but also in avoidance of piston slap and piston ring slap, in a large measure. Although the auxiliary springy elements inherently may be quite freely flexible, owing to their comparative thinness, they nevertheless may be made of fairly stiff stock and, at all events, will function as such effective stabilizing means, with substantially increased stiffened resiliency, when in actual operative use, because of their wedge-like conical formation, as split rings, and their cramped or crowded position within the piston grooves.

Now, assuming that, in a four cycle engine for instance, the piston is traveling on either its compression upstroke or on its power downstroke, there is a strong tendency towards a partial leakage of the gaseous charge, around behind the piston rings, during the aforesaid strokes or both before and after ignition of the charge, by way of the annular spaces 27, the piston grooves and the annular spaces 28, which is all the more or less pronounced proportionately to the looseness of fit of the piston rings within their housing grooves.

By my arrangement, however, and referring more particularly to the upper portion of Figure 3, the upper edge portion of an auxiliary springy element 10 expansibly engages the upper inner face of a piston ring 19, and forms therewith a resiliently annular leak-proof seal.

It accordingly follows that any leakage of compression by way of the space 27 would have to pass into the space 25, behind the conical wall of the auxiliary element 10, being barred from passage into the space 26, and hence out through the space 28, both because of the annular leak-proof seal aforesaid and also by virtue of a further annular leak-proof seal established by the edge portion 12, of the auxiliary element, seated in the lower corner formed by the bottom 16 and surface 18 of the piston groove. In other words, any leakage of compression, through the space 27, would be dammed up within the annular space 25, and would never enter the space 26 that is in communication with the space 28, because of the conjoint action of the combined or dual annular seals aforesaid, which are established between the auxiliary element 10 and the upper inner face of the piston ring, in the one instance, and between said auxiliary element and the lower corner of the piston ring groove, in the other instance.

Compression entering the chamber 25, however, would in fact further aid the aforesaid annular leak-proof sealing, because of its downward pressure, in some degree, and its substantial radial pressure on the conical band spring ring; it would further augment the expansible pressure of the said conical band spring ring, for more positively spreading the piston ring into snug relation with the cylinder; and also, becoming dammed up within the annular chamber 25, against outlet entry into the annular chamber 26 that communicates with the annular space 28, any such pent up pressure within the chamber 25 would obviously stop further leakage thereinto by way of the space 27 in communication with the cylinder.

With reference to the pumping of oil, and as is understood, there may be said to be both a suctional and lifting force, during the strokes of the pistons, tending to continuously raise lubricating oil from the crank case up the walls of the cylinders, and which oil eventually finds its way into the combustion chambers of the cylinders. This pumping of oil is more or less effected proportionately to the wear of the piston rings and their looseness of fit within the piston grooves, and it has been found that the greatest upward leakage is around back of the piston rings, by way of the annular spaces 28, the piston grooves and the annular spaces 27, or just the reverse of the leakage of compression. The objections to this oil pumping has hereinbefore been set forth.

In overcoming this upward passage of lubricating oil, I may simply reverse the position of the auxiliary element 10, preferably the one or ones that are lowermost. Such reversed position is illustrated at the lower portion of Figure 3, where a single piston groove, piston ring and auxiliary element are grouped or assembled, although there may be more than one set of these elements, and they may be located at the upper portion of the piston in association with the upper groups, as is quite customary, instead of being located at the lower portion of the piston, but the latter location has its advantages, at least under some conditions.

Having in mind the functioning of the uppermost auxiliary elements 10, in preventing the downward leakage of compression as before described, it will also be readily understood, from the lower portion of Figure 3, that in the reversed position, of the auxiliary element 10, a resiliently annular leak-proof seal will be formed around the lower inside face of the piston ring 19, as against the upward leakage of oil into the annular chamber 26 by way of the annular space 28, because of the expansible engagement of the said auxiliary element with the said lower inside face of the piston ring.

It accordingly follows that leakage of oil, by way of the annular space 28, would have to pass into the annular chamber 25, behind the conical wall of the auxiliary element 10, being barred from passage into the annular chamber 26, and hence out through the annular space 27, both because of the resiliently annular leak-proof seal aforesaid and also by virtue of the further annular leak-proof seal established by the edge portion 12, of the auxiliary element 10, seated in the upper corner formed by the bottom 16 and upper surface 17 of the piston groove, and such oil leakage becoming dammed up within said annular chamber 25 in a manner similar to that previously described with reference to the control of compression leakage.

In other words, the two arrangements described function in substantially the same manner, although one may be preferable to the other in the prevention of the leakage of compression as distinguished from the leakage or pumping of oil, and vice versa, but it is believed, as has before been stated, that with either arrangement of the auxiliary packing spring rings 10, regardless of whether their greatest diameters were all disposed upwardly or downwardly, the said springy band rings would in fact function efficiently to prevent both the downward leakage of compression and also the upward pumping of oil, around behind the piston rings.

In other words, there is such a positive double sealing owing to the conjoint functioning of the aforesaid dual annular leak-proof seals, either the lower or the upper corner seal, in the one instance, coacting with the expansible resilient seal, in the other instance, whether between the larger end surface of the springy band ring 10 and the upper inside face of its complementary piston ring, or vice versa with the lower inside face thereof, as the case might be, that there could hardly be any material leakage of any kind through said coacting annular seals in either direction.

The foregoing description of operation would also substantially apply should there be employed the slit type of the spring band ring shown at Figure 4, and in the main would likewise apply to the usage of the type of the auxiliary element 20 of Figures 5 and 6, so that there is hardly any need of further description thereof. In the latter case, however, the annular corner seals, whether lower or upper, are effected through the inturned rim, or the peripheral edge face 22 of smallest diameter, while the resiliently expansible annular leak-proof seals are made between the peripheral edge face 21, of the greatest diameter, and the upper inside face of the piston ring, or reversely with the lower inside face of the latter, if the element 20 be inverted.

From the foregoing complete description, it is believed that the full objects and advantages of the invention will be clearly apparent, but, while there has thus been disclosed certain preferred embodiments of the improvements, it may later be found to be expedient or desirable to make some alterations, although without departing from the real spirit or gist of the invention. It is to be understood, therefore, that the invention is not to be unnecessarily restricted to all of the details exactly as illustrated and described, excepting as they may come within the terms of the claims, or their equivalent, or as when fairly interpreted in the light of the specification if necessary.

What I do claim, as new and patentable, is:—

1. The combination with a piston having a piston ring groove and a piston ring therefor, of an auxiliary ring-like band spring packing, having its respective border edge extremities of uniformly continuous but of relatively greater and lesser diameter than the intermediate body portion thereof, mounted within said groove and longitudinally partitioning the space behind said piston ring into two annular chambers, respectively encompassing the intermediate outer and inner peripheral faces thereof, with its border extremity of greater diameter expansibly engaging said piston ring, in annular leak-proof relation, and with its border extremity of lesser diameter snugly engaging the wall surface of said groove in annular leak-proof relation.

2. The combination with a piston having a piston ring groove and a piston ring therefor, of an auxiliary ring-like band spring packing, having its respective border edge extremities of uniformly continuous but of relatively greater and lesser diameter than the intermediate body portion thereof, mounted within said groove and longitudinally partitioning the space behind said piston ring into two annular chambers, respectively encompassing the intermediate outer and inner peripheral faces thereof, with its border extremity of greater diameter expansibly engaging said piston ring, in annular leak-proof relation, and with its border extremity of lesser diameter snugly seated in annular leak-proof relation, within an annular corner of said groove formed by the joinder of a pair of its wall surfaces.

3. The combination with a piston having a piston ring groove and a piston ring therefor, of an auxiliary ring-like band spring packing, approximating in width the width of said piston ring and having its respective border edge extremities of uniformly continuous but of relatively greater and lesser diameter than the intermediate body portion thereof, mounted within said groove and longitudinally partitioning the space behind said piston ring into two analogously dimensioned annular chambers, respectively encompassing the intermediate outer and inner peripheral faces thereof, with its border extremity of greater diameter expansibly engaging said piston ring, in annular leak-proof relation, and with its border extremity of lesser diameter snugly seated, in annular leak-proof relation, within an annular corner of said groove formed by the joinder of a pair of its wall surfaces.

4. The combination with a piston having a piston ring groove and a piston ring therefor, of an auxiliary ring-like band spring packing that is of approximately truncated-cone form in cross-section, thereby having its respective border edge extremities of uniformly continuous but of relatively greater and lesser diameter than the intermediate body portion thereof, mounted within said groove and longitudinally partitioning the space behind said piston ring into two annular chambers, respectively encompassing the intermediate outer and inner peripheral faces thereof, with its border extremity of greater diameter expansibly engaging said piston ring, in annular leak-proof relation, and with its border extremity of lesser diameter snugly engaging the wall surface of said groove in annular leak-proof relation.

5. The combination with a piston having a plurality of piston ring grooves and complementary piston rings therefor, of auxiliary resilient band rings, having their respective border edge extremities of uniformly continuous but of different diameters, each being mounted within a complementary one of said grooves and partitioning the space behind their piston ring into annular chambers, with their portion of greater diameter expansibly engaging its said piston ring, in resiliently annular leak-proof relation, and with their portion of lesser diameter snugly engaging the wall surface of its said groove in annular leak-proof relation, one pair at least of said band rings being mounted in reversely disposed relation.

6. The combination of a piston ring and an auxiliary ring-like band spring packing expander therefor, which said elements are adapted for conjoint association within an annular piston ring groove, with said auxiliary element located innermost, the said auxiliary element being of a width approximating the width of said piston ring, with which it is associated, and being of approximately truncated-cone form in cross-section.

7. As an element for combinations of the character disclosed, embodying a piston having an annular groove for housing a piston ring, a ring-like band spring packing expander for said piston ring, which said expander element is of approximately truncated-cone form in cross-section.

8. As an element for combinations of the character disclosed, embodying a piston having an annular groove for housing a piston ring, a ring-like band spring packing expander for said piston ring, which said expander element is of the approximate width of said piston ring, with which it is to be associated, and is of approximately truncated-cone form in cross-section.

9. As an element for combinations of the character disclosed, embodying a piston having an annular groove for housing a piston ring, a ring-like band spring packing expander for said piston ring, which said expander element is of the approximate width of said piston ring, with which it is to be associated, is of approximately truncated-cone form in cross-section, and is provided with minute border edge extremity slits opening through its periphery.

In testimony whereof, I affix my signature.

ARTHUR B. LOW.